2,892,861
Patented June 30, 1959

2,892,861

ORGANIC THIOSULFATES

Edward L. Doerr and Van R. Gaertner, Dayton, Ohio, assignors to Monsanto Chemical Company, St. Louis, Mo., a corporation of Delaware No Drawing. Application July 23, 1956
Serial No. 599,347

6 Claims. (Cl. 260—453)

The present invention relates to organic thiosulfates and more particularly provides certain new higher alkyl thiosulfates which are characterized by extremely good wetting-out properties.

According to the invention, there are provided alkali metal or ammonium salts of branched chain, primary alkyl thiosulfates having from 12 to 16 carbon atoms in the alkyl radical. The present salts are prepared by contacting a branched chain alkyl halide of from 12 to 16 carbon atoms with an alkali metal or ammonium thiosulfate substantially according according to the scheme:

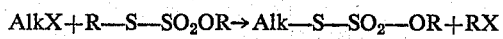

AlkX+R—S—SO$_2$OR→Alk—S—SO$_2$—OR+RX in which Alk denotes an alkyl radical of from 12 to 16 carbon atoms, R is selected from the class consisting of alkali metal and ammonium, and X is halogen.

Alkyl halides useful for the preparation of the present thiosulfates are, e.g., 2-butyloctyl bromide, branched chain, primary decyl bromide, 5-ethylnonyl iodide, 2,6,8-trimethylnonyl chloride, branched chain, primary dodecyl bromide, branched chain, primary tridecyl iodide, 7-ethyl-2-methylundecyl bromide, branched chain, primary hexadecyl bromide, etc. Of economic importance are the higher alkyl branched chain, primary alkyl halides which are prepared from alcohols obtained according to the "Oxo" process by the catalytic reaction of a lower olefin dimer, trimer, tetramer or pentamer with carbon monoxide and hydrogen under high pressure. Of outstanding utility is the branched chain, primary tridecyl thiosulfate which is prepared according to the present process from an alkali metal or ammonium thiosulfate and the tridecyl halide which is obtained from a tridecyl alcohol manufactured by the "Oxo" process by the high pressure reaction of propylene tetramer or isobutylene trimer with carbon monoxide and hydrogen.

Either ammonium thiosulfate or the alkali metal thiosulfates, e.g., sodium, potassium or lithium thiosulfate undergo the reaction with the branched chain alkyl halide to give the corresponding ammonium or alkali metal salts of the alkyl thiosulfates. Examples of the alkyl thiosulfate salts provided by the invention are sodium 2,6,8-trimethylnonyl thiosulfate, potassium 2-butyloctyl thiosulfate, lithium branched chain, primary tridecyl thiosulfate, sodium 2-butyloctyl thiosulfate, ammonium branched chain, primary dodecyl thiosulfate, sodium 2-ethyl-7-methylundecyl thiosulfate, ammonium branched chain, primary hexadecyl thiosulfate, etc.

Reaction of the alkyl halide with the alkali metal or ammonium thiosulfate takes place readily by heating a mixture of the two reactants at a temperature of, say, from 50° C. to 150° C. in the presence or absence of an inert diluent or solvent. Refluxing temperatures are preferred. For smooth reaction a liquid diluent is generally recommended. Conveniently, this may be a mixture of solvents for the inorganic and organic constituents of the reaction mixture, e.g., a mixture of water and an organic liquid such as ethanol, isopropanol, benzene, acetone, ethyl ether, etc. The by-product alkali metal or ammonium halide is readily removed from the reaction mixture either by decantation and/or alternate concentration, dissolution and precipitation. Alternative procedure involves extraction of the alkyl thiosulfate with an organic solvent such as acetone, chloroform or tetrahydrofuran, stripping off the solvent from the extract, and finally drying the alkyl thiosulfate salt.

The present branched chain, primary alkyl thiosulfates may also be prepared by reaction of the corresponding branched chain, primary alkanethiol with chlorosulfonic acid as disclosed in our copending application Serial No. 599,346, filed of even date.

While higher alkyl thiosulfates generally possess some surfactant properties we have found that the present branched chain, primary alkyl thiosulfates having from 12 to 16 atoms in the alkyl radical have outstanding wetting-out abilities.

The invention is further illustrated, but not limited, by the following examples.

Example 1

This example describes the preparation of a branched chain, primary alkyl thiosulfate from a branched chain, primary hexadecyl bromide, B.P. 147°–165° C./13 mm., $n_D^{25}$ 1.4650, obtained from the branched chain, primary hexadecanol prepared according to the "Oxo" process from propylene pentamer, carbon monoxide and hydrogen A mixture consisting of 102.0 g. (0.33 mole) of said branched chain, primary hexadecyl bromide, 100 g. (0.66 mole) of sodium thiosulfate pentahydrate, 300 g. of ethanol and 150 g. of water was refluxed for 9 hours. The resulting reaction mixture was poured into a separatory funnel and the lower aqueous salt layer was discarded. The remaining layer was then distilled to remove a mixture of ethanol and water while gradually replacing the mixture with isopropanol. The resulting solution was then filtered at 50–55° C. and the filtrate again concentrated. Treatment of the concentrate with excess isopropanol precipitated additional salts which were filtered off. Concentration of the filtrate to a pot temperature of 30–35° C./18 mm. gave 123.8 g. of product which still contained some isopropanol. 117.3 g. of this product was dried for 16 hours in a vacuum oven at a temperature of 39° C. to give 110.1 g. of the substantially pure sodium salt of branched chain, primary hexadecyl thiosulfate analyzing 16.56% sulfur as against 17.78% the calculated value.

Example 2

A mixture consisting of 99.7 g. of 2-butyloctyl bromide, 129.0 g. of sodium thiosulfate pentahydrate, 300 g. of ethanol and 100 g. of water was charged to a one-liter reactor which was equipped with stirrer, thermometer and refluxing condenser. The whole was brought to a refluxing temperature and refluxing was continued for 22 hours. The resulting reaction mixture was transferred to a separatory funnel. Of the layers which formed the lower aqueous layer and the middle layer (unreacted bromide) were withdrawn. The remaining upper ethanol layer was subsequently treated with water and extracted with several portions of carbon tetrachloride to remove any bromide. It was then concentrated under vacuum and isopropanol was added to precipitate inorganic salts. After filtering off the salts, the filtrate was then dried in a stirred reactor at a pot temperature of from 35–40° C./20 mm. The semi-solid paste thus obtained was dried in a vacuum oven for 20 hours at a temperature of 40° C. There was thus obtained 33.0 g. of the substantially pure sodium 2-butyloctyl thiosulfate.

Example 3

This example describes preparation of a branched chain, primary alkyl thiosulfate from a branched chain, primary tridecyl bromide, B.P. 133–142° C./12–13 mm., $n_D^{25}$ 1.4613 obtained from the branched chain, primary tridecanol prepared according to the "Oxo" process by the reaction of propylene tetramer or isobutylene trimer from carbon monoxide and hydrogen.

To a one-liter reactor equipped with reflux condenser, stirrer and thermometer there was added 131.6 g. (0.5 mole) of a branched chain, primary tridecyl bromide, 124.1 g. (0.5 mole) of sodium thiosulfate pentahydrate, 300 g. of ethanol and 300 g. of water. The whole was refluxed (82° C.) with stirring for 2.5 hours at the end of which time the reaction mixture was clear except for a very small amount of oil which had settled at the bottom of the reaction vessel. After allowing the reaction mixture to stand for several days it was concentrated under reduced pressure to a pot temperature of about 40° C. It was then diluted with isopropanol, and the salt which precipitated out was filtered off. The filtrate was again concentrated, the salt which precipitated out was filtered and additional isopropanol was added to the filtrate. The isopropanol diluted filtrate was then again concentrated to a pot temperature of below 40° C. and the inorganic salts which precipitated out from the concentrated product were filtered off. The resulting filtrate was dried at a temperature of below 40° C. to give 150 g. of the substantially pure sodium branched chain, primary tridecyl thiosulfate which was found to be completely soluble in acetone, ether, hexane, benzene, methylene chloride, chloroform and tetrahydrofuran.

Example 4

A mixture consisting of 131.6 g. (0.5 mole) of acid washed branched chain, primary tridecyl bromide (obtained as in Example 3), 130.0 g. (0.524 mole) of sodium thiosulfate pentahydrate, 300 g. of ethanol and 100 g. of water was refluxed for 3 hours at the end of which time 2.0 g. of sodium iodide was added. The tridecyl bromide was the same as that used in Example 3. Refluxing was then continued for an additional 4 hours. The whole was then concentrated under reduced pressure, and isopropanol was added in order to precipitate inorganic salts which were filtered off. Concentration of the filtrate precipitated more salts. After filtering these off the remaining product was dried at a pot temperature of from 40 to 45° C./15 mm. to give 171.5 g. of the pasty, white sodium branched chain, primary tridecyl thiosulfate which became free of any isopropanol odor after drying overnight in a vacuum oven at a temperature of 50° C.

Example 5

The sodium branched chain, primary hexadecyl, 2-butyloctyl, and branched chain tridecyl thiosulfates, of Examples 1–4 above, as well as some other sodium branched or alkyl thiosulfates were tested for wetting-out efficiency by the Draves test of the American Association of Textile Chemists. The wetting speeds thus obtained are shown in the following table:

| Sodium Alkyl Thiosulfate Tested | Speed of Wetting in Seconds at Percent Concentration | | | | |
|---|---|---|---|---|---|
| | 0.5 | 0.26 | 0.125 | 0.062 | 0.031 |
| Branched hexadecyl (Ex. 1) | 3.6 | 5.1 | 7.1 | 13.0 | 44.3 |
| 2-butyloctyl (Ex. 2) | Inst. | 2.6 | 13.7 | 180+ | |
| Branched Tridecyl (Ex. 3) | Inst. | 2.2 | 6.6 | 22.6 | 180+ |
| Branched Tridecyl (Ex. 4) | Inst. | 2.8 | 6.6 | 24.9 | 180+ |
| n-dodecyl | 6.8 | 7.8 | 11.3 | 27.3 | 180+ |
| Branched decyl | 6.0 | 38.1 | 180+ | | |
| n-decyl | 6.8 | 17.9 | 180+ | | |
| n-hexadecyl | insoluble under test conditions. | | | | |

What we claim is:

1. An organic thiosulfate salt selected from the class consisting of alkali metal and ammonium branched chain, primary alkyl thiosulfates having from 12 to 16 carbon atoms in the branched chain alkyl radical.

2. An alkali metal branched chain, primary alkyl thiosulfate having from 12 to 16 carbon atoms in the branched chain alkyl radical.

3. Sodium branched chain, primary alkyl thiosulfate having from 12 to 16 carbon atoms in the branched chain alkyl radical.

4. Sodium branched chain, primary hexadecyl thiosulfate.

5. Sodium branched chain, primary 2-butyloctyl thiosulfate.

6. Sodium branched chain, primary tridecyl thiosulfate.

References Cited in the file of this patent
UNITED STATES PATENTS

| | | |
|---|---|---|
| 1,969,612 | Kaiser et al. | Aug. 7, 1934 |
| 2,402,642 | Lazier et al. | June 25, 1946 |
| 2,609,397 | Gresham et al. | Sept. 2, 1952 |
| 2,618,649 | Van Bavel et al. | Nov. 18, 1952 |
| 2,633,473 | Bruner | Mar. 31, 1953 |
| 2,654,772 | Pavlic | Oct. 6, 1953 |